United States Patent [19]

Borruso

[11] 4,231,081

[45] Oct. 28, 1980

[54] BULB MOUNT FOR VEHICLE LAMPS

[75] Inventor: Joseph V. Borruso, Edison, N.J.

[73] Assignee: Abex Corporation, New York, N.Y.

[21] Appl. No.: 834,360

[22] Filed: Sep. 19, 1977

[51] Int. Cl.[3] .............................................. H01G 1/14

[52] U.S. Cl. ...................................... 362/306; 362/61; 362/390; 362/369

[58] Field of Search ................. 362/61, 390, 306, 296, 362/369, 370, 371; 248/605, 618

[56] References Cited

U.S. PATENT DOCUMENTS

| | | | |
|---|---|---|---|
| 3,327,110 | 6/1967 | Baldwin | 362/390 |
| 3,757,109 | 9/1973 | Knecht et al. | 362/390 |
| 4,103,323 | 7/1978 | Urbanek | 362/306 |

*Primary Examiner*—Benjamin R. Padgett
*Assistant Examiner*—J. L. Barr
*Attorney, Agent, or Firm*—Thomas S. Baker, Jr.; David A. Greenlee

[57] ABSTRACT

A lamp having a bulb secured in a flexible bulb support is resiliently mounted in the lamp to reduce the shocks and vibrations transmitted in any direction from the lamp to the bulb.

6 Claims, 5 Drawing Figures

BULB MOUNT FOR VEHICLE LAMPS

BACKGROUND OF THE INVENTION

This invention relates to vehicle lamps and more particularly to an improved means for securing a bulb in a lamp.

Replacement of lamps which are mounted in vehicles and have failed, particularly those which are mounted in commercial vehicles, is time consuming and expensive. A common cause of failure of such lamps is breakage of the bulb filament due to repeated and excessive shocks and vibrations. Accordingly, it is desired to provide a means for mounting a bulb in a lamp which will significantly reduce the shocks and vibrations transmitted from the vehicle to the bulb filament.

Numerous devices have been proposed to reduce the shocks and vibrations transmitted to bulb filaments. Such devices have been largely unsuccessful because they are ineffective against shocks transmitted to the lamp from either direction or are too costly or both.

SUMMARY OF THE INVENTION

The instant invention provides a lamp having a bulb secured in a flexible bulb support which is resiliently mounted in the lamp to reduce the shocks and vibrations transmitted in any direction from the lamp to the bulb. A dampening device attached to the bottom of the flexible bulb support inhibits horizontal and vertical movement of the bulb support to further reduce the intensity of the shocks and vibrations transmitted from the vehicle to the bulb.

DESCRIPTION OF THE PREFERRED EMBODIMENT

Figure 1:
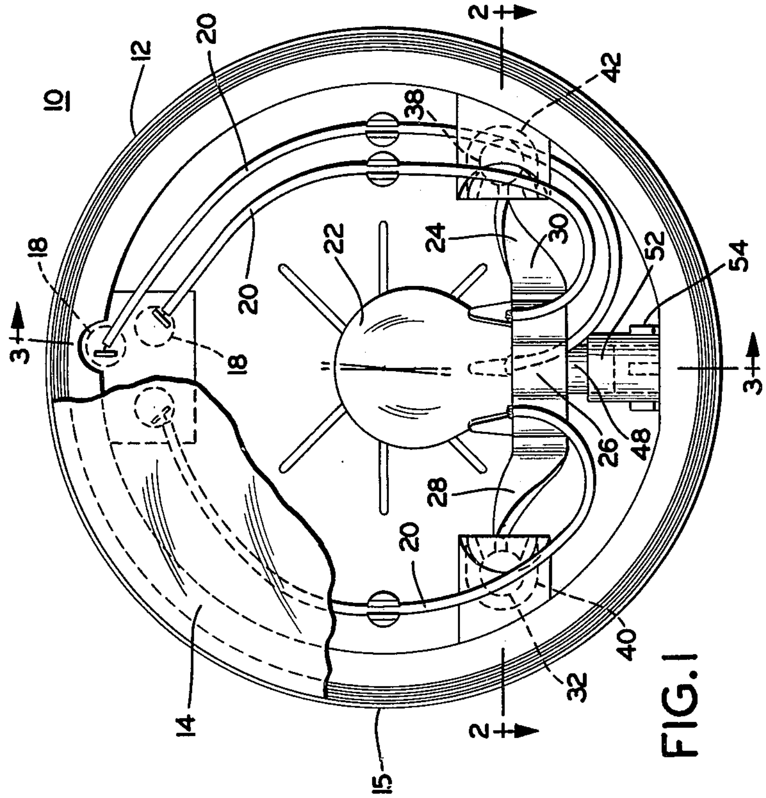
FIG. 1 is a view of a lamp having a bulb support constructed according to the instant invention with the lens broken away.
Figure 2:
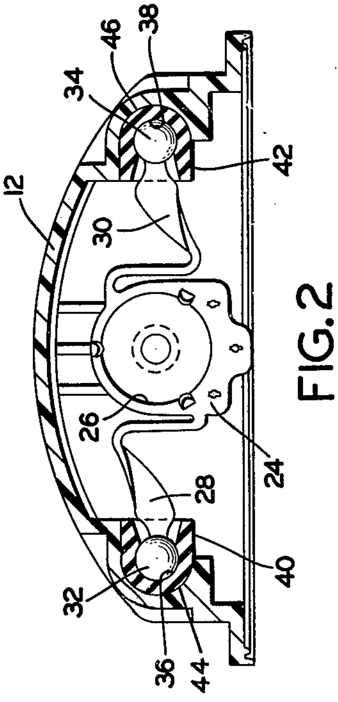
FIG. 2 is a view along line 2—2 of FIG. 1 with the bulb and wires removed from the lamp.

Referring now to FIGS. 1 and 2 of the drawings, a lamp 10 includes a curved relatively rigid reflector 12 which is adapted to be secured to a vehicle, in any suitable manner, and which is subjected to shocks and vibrations. A lens 14 is sealed onto the outer edge 15 of the concave face of reflector 12 by a suitable adhesive and cooperates with reflector 12 to form a bulb space 16. A plurality of electrical connectors 18 are molded into the back side of reflector 12. One end of each of the connectors 18 receives a mating connector, not shown, connected to the vehicle wiring system. The opposite end of each of the connectors 18 is connected to a wire 20 which is connected to a contact on a bulb 22. Three wires 20 are shown since a vehicle bulb 22 commonly has two filaments and a third wire is required for a ground since the lamp 10 in this invention is non-metallic. The wires 20 can be connected to contacts if bulb 22 has a base or to wires leading from a bulb envelope if the bulb has no base and is instead intended to be potted in a receptacle. Either type of bulb can be used in the instant lamp.

Bulb 22 is secured in a bulb support 24. The support 24 has a round, centrally located bulb receiving portion 26 which receives the lower portion of bulb 22. Support 24 has a pair of angular arms 28, 30 which terminate with spherical ends 32, 34 respectively. Bulb support 24 is constructed of a flexible material such as nylon which will permit arms 28, 30 to bend or twist when a sizable shock is applied to them.

The spherical ends 32, 34 of arms 28, 30 are received in complimentary sockets 36, 38 formed in resilient mounting members 40, 42. From FIG. 5 it can be seen that ends 32, 34 of bulb support 24 are movable in mounting members 40, 42 and bulb support 24 can pivot about a plurality of axis in each of the mounting members. The mounting members 40, 42 have curved outer surfaces 44, 46 that are secured in complementary shaped receptacles formed in the concave face of reflector 12. The mounting members 40, 42 are constructed out of a resilient material such as molded rubber which deforms much more readily than the flexible bulb support 24.

A short cylindrical projection 48 which may be molded onto the bottom of bulb support 24 and constructed from the same material, as the support 24 is telescopically received on the inside 50 of a resilient tube 52 which is secured in a cylindrical projection 54 molded onto the bottom of reflector 12. Resilient tube 52 limits the amount that support 24 can pivot in sockets 36, 38 and centers support 24 so that bulb 22 is properly positioned in lamp 10.

Figure 5:
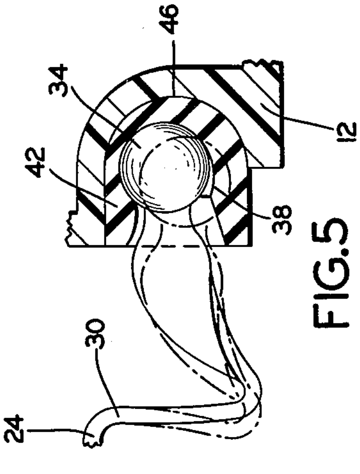
FIG. 5 is an enlarged view of one of the part-spherical ends of the flexible bulb support mounted in a resilient socket.

Referring to FIG. 5, when a vehicle is subjected to shock and vibration forces, these forces are transmitted through reflector 12 to resilient mounting members 40, 42. These members absorb some of the forces by deforming and transmit a reduced amount of force from shocks and vibrations to bulb support 24. Bulb support 24 flexes, as shown in FIG. 5, when the mounting members 40, 42 can deform no further and this flexure further reduces the force of shocks and vibrations transmitted to bulb 22.

Figure 3:
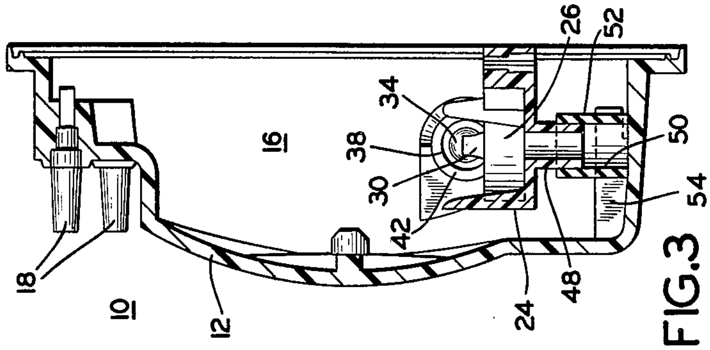
FIG. 3 is a view along line 3—3 of FIG. 1 with the bulb and wires removed from the lamp.
Figure 4:
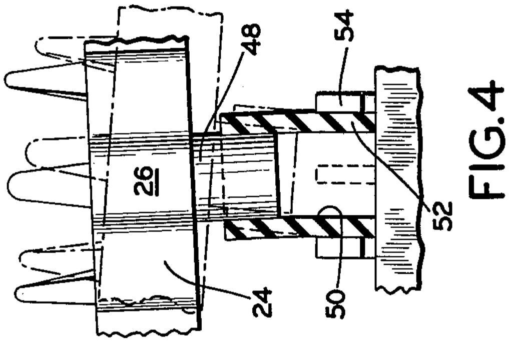
FIG. 4 is an enlarged view of the dampening device attached to the bottom of the flexible bulb support.

The resilient tube 52 and cylindrical projection 48 on the bottom of bulb support 24 cooperate to dampen movement of the support 24. Referring to FIG. 4, vertical movement of bulb support 24 is dampened since cylindrical projection 48 rubs against inside surface 50 of tube 52 during vertical movement. Horizontal movement of bulb support 24 is dampened since the resilient tube 52 is stretched when bulb support 24 and cylindrical projection 48 are moved horizontally and the stretched tube 52 biases the projection 48 towards the centered position.

Thus, it can be seen that flexible support 24 and resilient mounting members 40, 42 cooperate to substantially reduce the force of shocks and vibrations transmitted from lamp 10 to bulb 22. These forces are further reduced by the resilient tube 52 which dampens movement of bulb support 24 in any direction.

Although a preferred embodiment of the present invention has been illustrated and described, it will be apparent to those skilled in the art that various modifications may be made in the details and arrangements of the parts without departing from the spirit and scope of the invention as it is defined in the claims hereto appended.

What is claimed is:

1. A lamp for use in a vehicle subjected to shock and vibration having a rigid reflector, a lens attached to the reflector and cooperative therewith to define a cavity, a flexible bulb support having a central bulb receiving portion, and a bulb in the central receiving portion, characterized by means for resiliently mounting the flexible support in said cavity in the lamp, wherein a reduced amount of vehicle shock and vibration received by the lamp is transmitted to the bulb support since the resilient mounting permits movement of the entire bulb support relative to the reflector whereby the resilient mounting absorbs some shock and vibration and a reduced amount of the shock and vibration received by the bulb support is transmitted to the bulb since flexure of the bulb support absorbs some of the shock and vibration transmitted from the resilient mounting to the bulb support.

2. A lamp as recited in claim 1, wherein each end of said flexible bulb support is attached to a spherical element which is received in said resilient mounting means.

3. A lamp as recited in claim 2, wherein said flexible bulb support can freely pivot about a single horizontal axis in said resilient mounting means.

4. A lamp as recited in claim 2, including means for dampening vertical and horizontal movement of the bulb support relative to the reflector.

5. A lamp as recited in claim 4, wherein said dampening means includes a relatively rigid member attached to one of the bulb support or the reflector which cooperates with a second resilient member attached to the other of the bulb support or the reflector.

6. A lamp as recited in claim 5, wherein said rigid member and said second resilient member telescope and friction between the two members dampens vertical movement of said flexible bulb support, and said rigid member and said second resilient member cooperate to dampen movement of the bulb support in a horizontal plane.

* * * * *